(12) United States Patent
Wang et al.

(10) Patent No.: US 11,340,252 B2
(45) Date of Patent: May 24, 2022

(54) ACCELERATION MEASURING DEVICE AND ACCELERATION MEASURING METHOD OF THE SAME

(71) Applicant: BOE TECHNOLOGY GROUP CO., LTD., Beijing (CN)

(72) Inventors: Hong Wang, Beijing (CN); Changlin Leng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 196 days.

(21) Appl. No.: 16/618,595

(22) PCT Filed: May 31, 2019

(86) PCT No.: PCT/CN2019/089470
§ 371 (c)(1),
(2) Date: Dec. 2, 2019

(87) PCT Pub. No.: WO2020/001231
PCT Pub. Date: Jan. 2, 2020

(65) Prior Publication Data
US 2021/0325423 A1    Oct. 21, 2021

(30) Foreign Application Priority Data
Jun. 29, 2018 (CN) .......................... 201810715256.9

(51) Int. Cl.
*G01P 15/093* (2006.01)
(52) U.S. Cl.
CPC .................. *G01P 15/093* (2013.01)
(58) Field of Classification Search
CPC .................................................. G01P 15/093
See application file for complete search history.

(56) References Cited

U.S. PATENT DOCUMENTS 4,872,348 A * 10/1989 Curry ...................... G01H 9/00
73/653
9,702,992 B2 * 7/2017 Avenson ................ G01B 21/16
(Continued)

FOREIGN PATENT DOCUMENTS

CN    101368978 A    2/2009
CN    101692098      4/2010
(Continued)

OTHER PUBLICATIONS

International Search Report and Written Opinion dated Aug. 23, 2019 for PCT Patent Application No. PCT/CN2019/089470.
(Continued)

*Primary Examiner* — Xin Y Zhong
(74) *Attorney, Agent, or Firm* — Thomas | Horstemeyer, LLP

(57) ABSTRACT

An acceleration measuring device includes a housing with an inner cavity, a reference substance disposed in the inner cavity, an elastic supporting member connected between the bottom portion of the inner cavity and the reference substance, a light source secured to a side of the reference substance, a lens secured to the reference substance that is positioned at a side of the light source away from the reference substance, an image sensor at a top portion of the inner cavity and located at a side of the lens away from the reference substance for receiving light emitted by the light source and scattered by the lens, and a processor configured to calculate displacement information of the reference substance in a vertical direction according to light received by the image sensor, and calculate an acceleration of the reference substance according to the displacement information.

10 Claims, 2 Drawing Sheets

(56) References Cited

U.S. PATENT DOCUMENTS

| | | | | |
|---|---|---|---|---|
| 2012/0026734 A1* | 2/2012 | Keissary | ............... | G01P 15/093 |
| | | | | 362/235 |
| 2013/0016940 A1* | 1/2013 | Kim | ....................... | G01K 11/32 |
| | | | | 385/12 |
| 2014/0112094 A1* | 4/2014 | Fernihough | .......... | G01V 1/3808 |
| | | | | 367/7 |
| 2016/0116499 A1* | 4/2016 | Thompson | .............. | B81B 7/008 |
| | | | | 73/1.41 |

FOREIGN PATENT DOCUMENTS

| | | |
|---|---|---|
| CN | 101368978 B | 10/2010 |
| CN | 103529482 A | 1/2014 |
| CN | 103529482 B | 5/2016 |
| CN | 205353121 | 6/2016 |
| CN | 109061225 | 12/2018 |
| JP | H11183506 | 7/1999 |

OTHER PUBLICATIONS

1st Office Action dated Jul. 3, 2019 for Chinese Patent Application No. 201810715256.9.
2nd Office Action dated Dec. 4, 2019 for Chinese Patent Application No. 201810715256.9.
Notice of Allowance dated Apr. 2, 2020 for Chinese Patent Application No. 201810715256.9.
Mao (2008) "Inertial device testing and modeling" Harbin Engineering University Press.
Xia (2015) "Gyro North Seeking Technology" Aerospace Science and Technology Publishing Fund.

* cited by examiner

ACCELERATION MEASURING DEVICE AND ACCELERATION MEASURING METHOD OF THE SAME

This disclosure is based on International Patent Application No. PCT/CN2019/089470, filed on May 31, 2019, which is based on and claims priority to Chinese Patent Application No. 201810715256.9, entitled "ACCELERATION MEASURING DEVICE AND ACCELERATION MEASURING METHOD OF THE SAME", filed on Jun. 29, 2018, the entire contents of which are incorporated herein by reference.

TECHNICAL FIELD

The present disclosure relates to the technical field of sensors and, in particular, to an acceleration measuring device and an acceleration measuring method thereof.

BACKGROUND

The acceleration sensor is widely applied to various fields of aerospace, automobile brake starting detection, earthquake detection, engineering vibration measurement, geological exploration, vibration test and analysis, safety protection vibration reconnaissance, game control, gamepad vibration and shaking, and the like. Acceleration sensors are mainly classified into two types according to types of measured accelerations, one is an angular acceleration sensor, which is obtained by modifying a gyroscope, and the other is a linear acceleration sensor. The types of existing linear acceleration sensors can be mainly classified into piezoelectric type, piezoresistive type, capacitance type, servo type, and triaxial type according to different sensing principles. However, the existing linear acceleration sensor has various technical problems, such as slow response speed and high manufacturing cost to different degrees due to limits of the measurement principle.

The information disclosed in the background section above is only intended to enhance understanding of the background of the present disclosure, and thus may include information that does not constitute prior art known to those of ordinary skill in the art.

SUMMARY

The technical solution adopted by the present disclosure is as follows.

According to one aspect of the present disclosure, an acceleration measuring device is provided. The acceleration measuring device includes a housing, a reference substance, a light source, a lens, an image sensor, and a processor. The housing has an inner cavity with a cavity wall, a bottom portion at a bottom end of the cavity wall, and a top portion opposite to the bottom portion. The reference substance is disposed in the inner cavity through an elastic supporting member, and the elastic supporting member is connected between the bottom portion of the inner cavity and the reference substance. The light source is secured to a side of the reference substance away from the bottom portion of the inner cavity. The lens is secured to the reference substance and is positioned at a side of the light source away from the reference substance. The image sensor is secured to the top portion of the inner cavity and positioned at a side of the lens away from the reference substance for receiving light emitted by the light source and scattered by the lens. The processor is configured to calculate displacement information of the reference substance in a vertical direction according to light received by the image sensor, and calculate an acceleration of the reference substance according to the displacement information.

According to one embodiment of the present disclosure, the reference substance is secured in a bracket, and the elastic supporting member is vertically connected between the bottom portion of the inner cavity and the bracket.

According to one embodiment of the present disclosure, the elastic supporting member is vertically connected between the bottom portion of the inner cavity and the reference substance.

According to one of the embodiments of the present disclosure, the acceleration measuring device further includes an elastic guide. The elastic guide is connected between the cavity wall of the inner cavity and the reference substance so as to limit the reference substance in a horizontal direction.

According to one embodiment of the present disclosure, the elastic guide is a beryllium bronze spring.

According to one embodiment of the present disclosure, the elastic guide is horizontally connected between a periphery of the reference substance and the cavity wall of the inner cavity.

According to one embodiment of the present disclosure, the reference substance is secured in a bracket, the elastic supporting member is vertically connected between the bottom portion of the inner cavity and the bracket, and the elastic guide is connected between the cavity wall of the inner cavity and the bracket.

According to one embodiment of the present disclosure, the acceleration measuring device further includes an electromagnetic stabilizing mechanism including an electromagnet and an electromagnetic coil. The electromagnet is disposed at a periphery of the reference substance. The electromagnetic coil is wound on the inner wall of the inner cavity and corresponds to the electromagnet. When the image sensor is configured to detect the displacement information of the reference substance, the electromagnetic coil is energized to generate a magnetic field, and the electromagnet drives the reference substance to be stable under the action of the magnetic field.

According to one embodiment of the present disclosure, the light source is a parallel light source.

According to one embodiment of the present disclosure, the lens is a conical lens.

According to another aspect of the present disclosure, an acceleration measuring method for measuring acceleration of an object to be measured is provided. The acceleration measurement method includes the following steps:

providing an acceleration measuring device proposed by the present disclosure and explained in the above embodiments;

securing the housing of the acceleration measuring device on the object to be measured;

when the object to be measured is output as an acceleration, the image sensor receives a light emitted by the light source and scattered by the lens and measures a displacement signal of the reference substance according to the light and the processor calculates an acceleration according to the displacement signal and the following formula:

$$a = K \cdot S / M,$$

where $a$ is the acceleration, $K$ is a stiffness coefficient of the elastic supporting member, $S$ is the displacement of the reference substance in a vertical direction, and $M$ is a mass of the reference substance.

As known from the above-mentioned technical solution, the acceleration measuring device and the acceleration measuring method thereof have the following advantages and positive effects.

According to the acceleration measuring device and the acceleration measuring method thereof, the image sensor is located above the lens for receiving light emitted by the light source and scattered by the lens, the displacement signal of the reference substance is measured according to the light, and the acceleration of the object to be measured is calculated, so that the acceleration measuring device can measure the displacement information of the reference substance by using the measurement principle of cooperating lens scattering with CCD sensing, and the acceleration of the reference substance, i.e., the acceleration of the object to be measured, is further measured by calculation. The present disclosure has a faster response speed and lower manufacturing cost compared to existing acceleration sensors.

The above and other objects, features, and advantages of the present disclosure will become more apparent from the following description of preferred embodiments of the present disclosure with reference to the accompanying drawings.

BRIEF DESCRIPTION OF THE DRAWINGS

Various objects, features, and advantages of the present disclosure will become more apparent from the following detailed description of, for example, embodiments of the present disclosure when taken in conjunction with the accompanying drawings. The drawings are merely exemplary illustrations of the present disclosure and are not necessarily drawn to scale. In the drawings, like reference numbers always designate the same or similar components. In the drawings.

Figure 1:
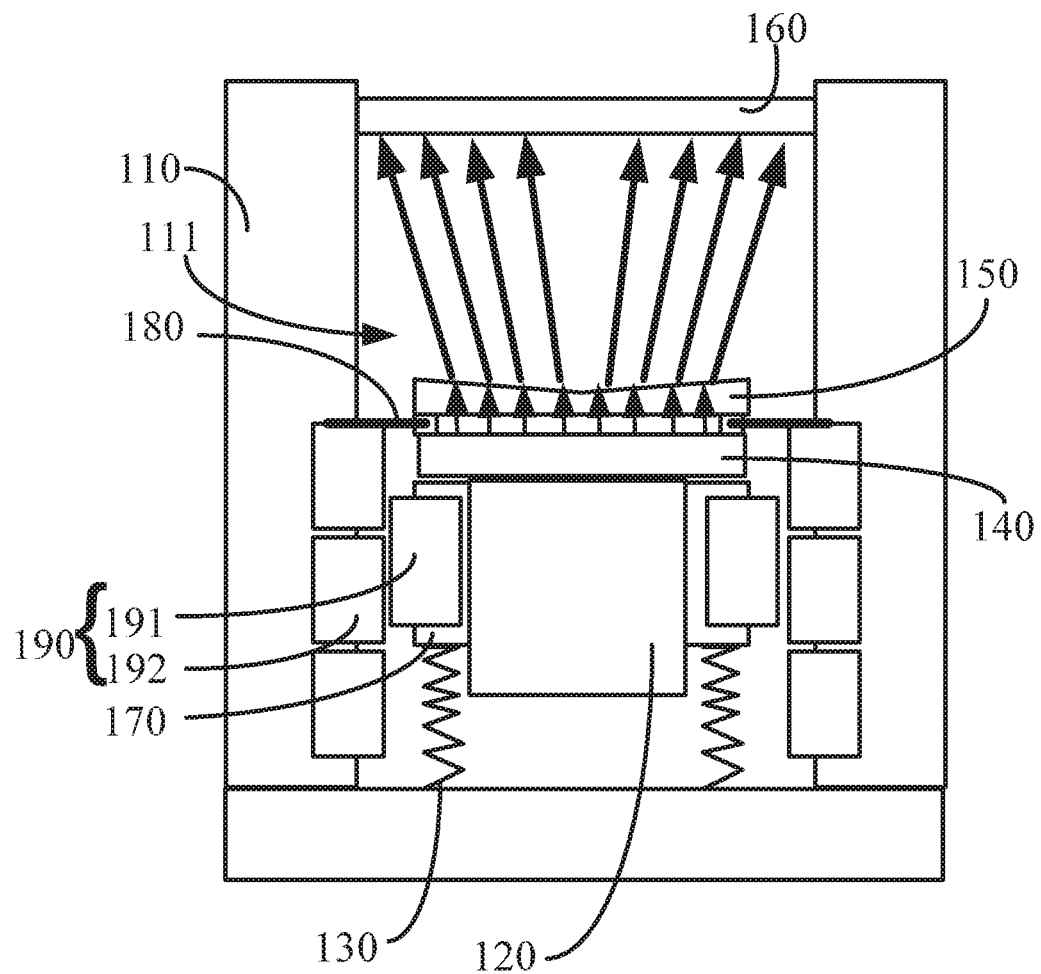
FIG. 1 is a schematic structural view of an acceleration measuring device according to an exemplary embodiment.

The reference numbers are explained below:

110: housing; 111: an inner cavity; 120: reference substance; 130: elastic supporting member; 140: light source; 150: lens; 160: charge coupled device image sensor; 170: bracket; 180: elastic guide; 190: electromagnetic stabilizing mechanism; 191: electromagnet; 192: electromagnetic coil.

BRIEF DESCRIPTION OF THE DRAWINGS

Exemplary embodiments embodying the features and advantages of the present disclosure will be described in detail in the following description. It should be understood that the present disclosure is capable of various modifications in the various embodiments without departing from the scope of the present disclosure, and the description and drawings thereof are intended to illustrate only and not limit the present disclosure.

The following description of the various exemplary embodiments of the present disclosure refers to the drawings, which constitute part of the present disclosure and show different exemplary structures, systems, and steps implementing various aspects of the present disclosure by way of example. It should be understood that other specific aspects of components, structures, exemplary devices, systems, and steps can be used, and structural and functional modifications can be made without departing from the scope of the present disclosure. Moreover, although the terms "bottom", "between", "inside", or the like may be used in this specification to describe various exemplary features and elements of the present disclosure, these terms are used herein only for convenience, for example, the direction according to the example shown in the drawings. Nothing in this specification should be construed as requiring a specific three dimensional orientation of the structure to fall within the scope of the disclosure.

Embodiment of Acceleration Measuring Device

FIG. 1 representatively shows a schematic structural view of an acceleration measuring device proposed by the present disclosure. In this exemplary embodiment, the acceleration measuring device proposed by the present disclosure is exemplified by a measuring device applied to measure linear acceleration of an object to be measured. It will be readily understood by those skilled in the art that various modifications, additions, substitutions, deletions, or other variations are made to the specific embodiments described below in order to apply the related designs of the present disclosure to other types of measuring devices. These variations are still within the scope of the principles of the acceleration measuring device provided by the present disclosure.

As shown in FIG. 1, in the present embodiment, the acceleration measuring device proposed by the present disclosure mainly includes a housing 110, a bracket 170, a reference substance 120, an elastic supporting member 130, a light source 140, a lens 150, and a charge coupled device image sensor 160. The structures, connection modes, and functional relationships of various main components of the acceleration measuring device proposed by the present disclosure will be described in detail with reference to the accompanying drawings.

As shown in FIG. 1, in the present embodiment, an inner cavity 111 is formed inside the housing 110, and most of the remaining components of the acceleration measuring device are disposed in the inner cavity 111 of the housing 110. When the acceleration measuring device provided by the present disclosure is used for measuring the acceleration of the object to be measured, the acceleration measuring device is placed on the object to be measured. That is, the housing 110 may be provided on the object to be measured. When a rocket is taken as an example of the object to be measured, the acceleration measuring device may be provided inside the rocket, and the housing 110 may be fixedly connected to an internal structure of the rocket, wherein the bottom portion of the housing 110 (i.e., the lower end of the housing 110 in FIG. 1) may be fixedly connected to the internal structure of the rocket. In addition, the housing 110 may be firmly and fixedly connected with the object to be measured via a connecting assembly such as a snap assembly and a bolt assembly, so that a motion state of the object to be measured can be timely and accurately transmitted to the housing 110.

As shown in FIG. 1, in the present embodiment, the bracket 170 is suspended in the inner cavity 111 of the housing 110, and the elastic supporting member 130 is vertically disposed and supported between the bottom portion of the inner cavity 111 of the housing 110 and the bottom portion of the bracket 170.

Further, in the present embodiment, the elastic supporting member 130 may be, for example, a spring structure, and in other embodiments, a structure such as a spring sheet may be used instead of the spring as the elastic supporting member 130 connected between the housing 110 and the bracket 170.

As shown in FIG. 1, in the present embodiment, the reference substance 120 is fixedly provided to the bracket 170. The reference substance 120 is a reference mass block, and has a regular shape, i.e. a center of mass of the reference substance 120 coincides with the geometric center thereof. Accordingly, the motion state of the object to be measured is transmitted to the reference substance 120 through the housing 110 and the elastic supporting member 130, so that the reference substance 120 obtains the motion state corresponding to the object to be measured, and the motion state of the object to be measured, i.e., the acceleration of the object to be measured can be calculated by measuring the motion state of the reference substance 120. When the reference substance 120 is used to simulate the motion state corresponding to the object to be measured, the influence of the buffering action of the elastic supporting member 130 can be determined during the acceleration calculation, and the impulse value generated by the buffering action can be calculated because the rigidity value of the elastic supporting member 130 is known and unvaried. In the description of the present embodiment, for convenience of understanding and description, the weight of structures other than the reference substance 120 is omitted in terms of a mass point system composed of the reference substance 120, the bracket 170, and the structures (such as the light source 140, the lens 150, and the electromagnet 191) disposed on the bracket 170. Alternatively, it can be understood that the weight of the reference substance 120 is much larger than the weight of other structures, so that the weight of the other structures does not affect the centroid position of the whole mass point system, and does not affect the accurate transmission and measurement of the motion state of the object to be measured.

In other embodiments, the elastic supporting element 130 may be vertically supported between the bottom portion of the reference substance 120 and the bottom portion of the inner cavity 111 of the housing 110, and in this embodiment, the elastic supporting element is disposed at the bracket 170 or connected to other structures of the bracket 170 (such as the light source 140, the lens 150, the electromagnet 191, and the elastic guide 180), and may also be disposed directly on the reference substance 120 or directly connected to the reference substance 120, which is not limited by the present embodiment.

As shown in FIG. 1, in the present embodiment, the light source 140 is secured to the top portion of the bracket 170. In other embodiments, when the bracket 170 is not provided, the light source 140 may be directly secured to the top portion of the reference substance 120, and the so-called "top portion" is an end of the reference substance 120 (or the bracket 170) away from the bottom portion of the inner cavity 111.

Further, in the present embodiment, the light source 140 may be, for example, a parallel light source.

As shown in FIG. 1, in the present embodiment, the lens 150 is secured to the top portion of the bracket 170 and is located above the light source 140, i.e. at a side of the light source 140 away from the reference substance 120 (or the bracket 170). In other embodiments, when the bracket 170 is not provided, the lens 150 may be directly secured to the top portion of the reference substance 120, and the so-called "top portion" is an end of the reference substance 120 (or the bracket 170) away from the bottom portion of the inner cavity 111. Accordingly, the lens 150 can scatter the light emitted upward from the light source 140.

Further, in the present embodiment, the lens 150 may be, for example, a conical lens. The conical lens has a dispersion function similar to that of a triangular prism, and compared with other types of lenses 150, the optical system based on the conical lens is simpler in design, and the lens 150 is lower in manufacturing cost.

Further, in the present embodiment, the lens 150 may be vertically spaced apart from the light source 140 by a gap, for example.

As shown in FIG. 1, in the present embodiment, a Charge Coupled Device (CCD) is secured to the top portion of the inner cavity 111 and located above the lens 150, the CCD can receive the light emitted by the light source 140 and scattered by the lens 150, and a processor is used to calculate a displacement signal of the reference substance 120 according to the light received by the CCD, and calculate the acceleration of the object to be measured according to the displacement signal.

Specifically, the CCD may adopt an existing design, and the main measurement principle is that the position of the reference substance 120 is reflected on the CCD through the lens 150 in the form of light, the position of the reference substance 120 is different, an aperture formed by light scattering on the CCD changes accordingly, the processor may obtain the vertical displacement of the mass point system according to the change of the aperture on the CCD (specifically, the relationship between the change value of the aperture of the CCD and the displacement may be calibrated through experiments), and then the displacement signal may be converted into the acceleration of the mass point system through the processor, that is, the acceleration of the object to be measured is obtained. In addition, the mass point system is an integral structure composed of the reference substance 120, the bracket 170, the light source 140 and the lens 150 (also including the electromagnet 191).

As shown in FIG. 1, in the present embodiment, the acceleration measuring device further includes an elastic guide 180. The elastic guide 180 is connected between the cavity wall of the inner cavity 111 of the housing 110 and the reference substance 120 to horizontally limit the reference substance 120.

Specifically, as shown in FIG. 1, in the present embodiment, the elastic guide 180 is horizontally connected between the cavity wall of the inner cavity 111 of the housing 110 and the bracket 170 based on the design of the reference substance disposed in the bracket 170, so as to horizontally limit the bracket 170, that is, indirectly limit the reference substance 120. Accordingly, the elastic guide 180 is provided to restrain the mass point system to move in the horizontal direction, and make it only move in the vertical direction, so that change of aperture on the CCD can fully embody the vertical displacement of the mass point system, improving measurement accuracy.

As shown in FIG. 1, it should be noted that the elastic guide 180 is, for example, connected to the upper half of the bracket 170, i.e., a portion of the bracket 170 to which the light source 140 is secured. The structure of the flexible guide 180 in FIG. 1 is shown only schematically, and the flexible guide 180 is actually connected to the bracket 170 rather than to the light source 140 or other structures. In addition, when the bracket 170 is not provided, the elastic guide 180 may be connected to the reference substance 120.

Further, in the present embodiment, the elastic guide 180 may be, for example, a beryllium bronze spring. The beryllium bronze spring belongs to a spring material with light weight and good performance, and has good rigidity in the horizontal direction (i.e., the motion direction vertical to the mass point system), so that the mass point system including the reference substance can be limited in the horizontal direction on the basis of ensuring elasticity in the vertical direction.

Further, in the present embodiment, the elastic guide 180 is horizontally connected between the periphery of the upper portion of the reference substance 120 (i.e., the bracket 170) and the cavity wall of the inner cavity 111 of the housing 110, for example. In addition, the elastic guide 180 may be disposed at other height positions, but should be adapted to the mass center of the reference substance 120 to avoid the inertia moment as much as possible and affect the system stability.

As shown in FIG. 1, in the present embodiment, the acceleration measuring device further includes an electromagnetic stabilizing mechanism 190. The electromagnetic stabilizing mechanism 190 mainly includes an electromagnet 191 and an electromagnetic coil 192. The electromagnet 191 is disposed on the periphery of the reference substance 120 or on the periphery of the bracket 170. The electromagnetic coil 192 is wound on the inner wall of the inner cavity 111 of the housing 110 and corresponds to the position of the electromagnet 191. Accordingly, when the CCD detects the displacement information of the reference substance 120, the electromagnetic coil 192 is supplied with current from the external power supply and generates a magnetic field, and the magnetic field acts on the electromagnet 191 to generate a stabilizing force thereon, so that the electromagnet 191 drives the reference substance 120 to tend to be stable under the action of the magnetic field.

As described above, taking an example that the acceleration measuring device is installed on the rocket in a direction shown in FIG. 1, when the rocket accelerates to complete the conversion to a uniform rising phase, the vibrator inevitably forms a simple harmonic vibration due to the existence of the vibrator (mass point system) and the spring (elastic supporting member 130), and at this time, the electromagnetic stabilizing mechanism 190 may be used to apply a force in a direction opposite to the spring force to the mass point system, so as to rapidly stabilize the mass point system. In addition, when the rocket generates acceleration, the electromagnetic stabilizing mechanism 190 may also serve as a "generator", i.e., the electromagnetic stabilizing mechanism 190 can feed back the position of the vibrator (the lens 150), so that the reliability redundancy of the system is increased.

The measurement principle of the acceleration measuring device of the present disclosure is introduced as follows.

Firstly, a housing of the acceleration measuring device is provided on an object to be measured;

when the object to be measured outputs an acceleration, the reference substance displaces, the charge coupled device receives light emitted by the light source and scattered by the lens, and measures a displacement signal of the reference substance according to the light;

the displacement signal is transmitted to a processor, and the acceleration is calculated according to the following formula:

$$a = K \cdot S / M$$

where a is the acceleration, K is the stiffness coefficient of the elastic supporting member (known and obtained by measurement), S is the displacement of the reference substance in the vertical direction, i.e. a compression amount of the elastic supporting member (known and obtained by conversion of CCD detection values), and M is the mass of the reference substance (also known and obtained by measurement), which can be understood as a mass point system.

It should be noted that the above acceleration calculation formula "a=K·S/M" is derived specifically by the following known formula and steps.

Due to Newton's Second Law: f=ma (f: acting force; m: mass; a: acceleration); and Hooke's Law: f=ks (f: acting force; k: stiffness coefficient of spring; s: compression amount of the spring);

$$ks = ma; \text{ and}$$

$$a = ks/m,$$

so that, in combination with the above assignment definitions in this embodiment, a=K·S/M.

In addition, in the calculation process of the displacement of the reference substance, i.e., the acceleration of the object to be measured, when the reference substance is used to simulate the motion state corresponding to the object to be measured, the influence of the buffering action of the elastic supporting member can be determined in the calculation process of the acceleration, and the impulse value generated by the buffering action can be calculated because the rigidity value of the elastic supporting member 130 is known and unvaried. For example, it can be derived by the following formula: when the acceleration measuring device is in a non-inertial coordinate system, the acceleration of the non-inertial coordinate system is a, and if the reference substance reaches an equilibrium state, the inertial force applied to the reference substance should be Ma, the compression amount of the elastic supporting member is S, and the stiffness coefficient of the elastic supporting member is K, there is a relationship Ma=KS, and the impulse ft=Mat of the elastic supporting member is known, where t is time.

It should be noted herein that the acceleration measuring devices illustrated in the figures and described in this specification are only a few examples of many types of acceleration measuring devices that can employ the principles of the present disclosure. It should be clearly understood that the principles of the present disclosure are in no way limited to any of details of the acceleration measuring device or any of components of the acceleration measuring device shown in the drawings or described in the present specification.

Embodiment of Acceleration Measuring Method

Based on the above exemplary description of the acceleration measuring device, an exemplary embodiment of the acceleration measuring method proposed by the present disclosure will be described below. It will be readily understood by those skilled in the art that various modifications, additions, substitutions, deletions, or other variations are made to the specific embodiments described below in order to apply the related designs of the present disclosure to other measuring processes. These variations are still within the scope of the principles of the acceleration measuring device provided by the present disclosure.

Figure 2:
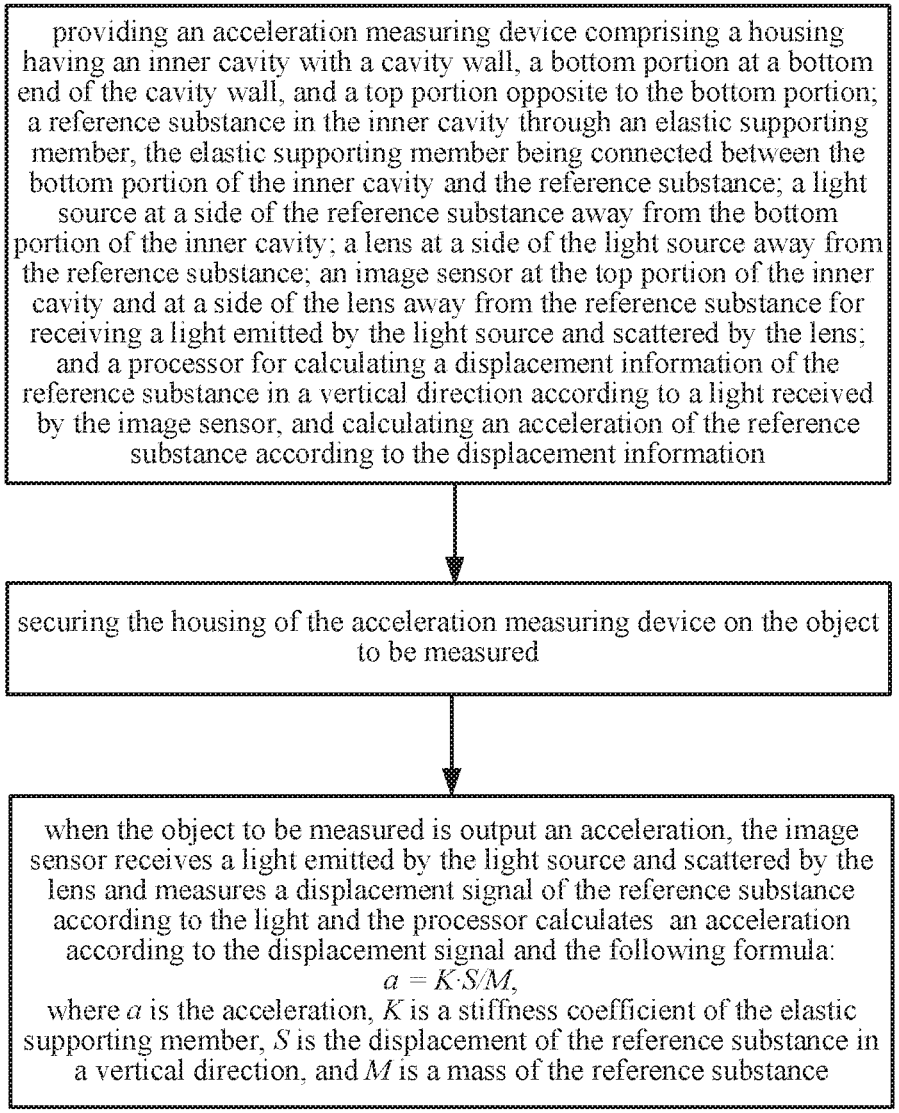
FIG. 2 is a flow chart illustrating an acceleration measuring method according to an exemplary embodiment.

As shown in FIG. 2, FIG. 2 is a flow chart illustrating an acceleration measuring method according to an exemplary embodiment. The acceleration measuring method provided by the disclosure can be used for measuring an acceleration of an object to be measured, and includes the following steps:

providing an acceleration measuring device proposed by the present disclosure and explained in the above embodiments;

securing the housing of the acceleration measuring device on the object to be measured;

when the object to be measured is output an acceleration, the image sensor receives a light emitted by the light source and scattered by the lens and measures a displacement signal of the reference substance according to the light and the processor calculates an acceleration according to the displacement signal and the following formula:

$$a = K \cdot S/M,$$

where a is the acceleration, K is the stiffness coefficient of the elastic supporting member (known and obtained by measurement), S is the displacement of the reference substance in the vertical direction, i.e. a compression amount of the elastic supporting member (known and obtained by conversion of CCD detection values), and M is the mass of the reference substance (also known and obtained by measurement), which can be understood as a mass point system.

It should be noted that the above acceleration calculation formula "a=K·S/M" is derived specifically by the following known formula and steps.

Due to Newton's Second Law: f=ma (f: acting force; m: mass; a: acceleration); and Hooke's Law: f=ks (f: acting force; k: stiffness coefficient of spring; s: compression amount of the spring);

$$ks = ma; \text{ and}$$

$$a = ks/m,$$

so that, in combination with the above assignment definitions in this embodiment, a=K·S/M.

In addition, in the calculation process of the displacement of the reference substance, i.e., the acceleration of the object to be measured, when the reference substance is used to simulate the motion state corresponding to the object to be measured, the influence of the buffering action of the elastic supporting member can be determined in the calculation process of the acceleration, and the impulse value generated by the buffering action can be calculated because the rigidity value of the elastic supporting member 130 is known and unvaried. For example, it can be derived by the following formula: when the acceleration measuring device is in a non-inertial coordinate system, the acceleration of the non-inertial coordinate system is a, and if the reference substance reaches an equilibrium state, the inertial force applied to the reference substance should be Ma, the compression amount of the elastic supporting member is S, and the stiffness coefficient of the elastic supporting member is K, there is a relationship Ma=KS, and the impulse ft=Mat of the elastic supporting member is known, where t is time.

It should be noted herein that the acceleration measuring methods illustrated in the figures and described in this specification are only a few examples of many types of acceleration measuring methods that can employ the principles of the present disclosure. It should be clearly understood that the principles of the present disclosure are in no way limited to any of details of the acceleration measuring method or any of steps of the acceleration measuring method shown in the drawings or described in the present specification.

In summary, according to the acceleration measuring device and the acceleration measuring method thereof provided by the present disclosure, the image sensor is located above the lens for receiving light emitted by the light source and scattered by the lens, the displacement signal of the reference substance is measured according to the light, and the acceleration of the object to be measured is calculated, so that the acceleration measuring device can measure the displacement information of the reference substance by using the measurement principle of cooperating lens scattering with CCD sensing, and the acceleration of the reference substance, i.e., the acceleration of the object to be measured, is further measured by calculation. The present disclosure has a faster response speed than the existing acceleration sensor since an optical system is added into the measuring device.

Furthermore, as the production technology of the photosensitive component is being mature, the acceleration sensor has lower manufacturing cost compared with the existing acceleration sensor.

Exemplary embodiments of the acceleration measuring device and the acceleration measuring method thereof proposed by the present disclosure are described and/or illustrated in detail above. However, embodiments of the present disclosure are not limited to the specific embodiments described herein, but rather, the components and/or steps of each embodiment can be used independently and separately from the other components and/or steps described herein. Each component and/or each step of an embodiment may also be used in combination with other components and/or steps of other embodiments. When introducing elements/components/etc. described and/or illustrated herein, the terms such as "a", "an", "the", and "said" are used to indicate the presence of one or more elements/components. The terms "comprise", "include", "have", "contain", and their variants are used to be open-type and are meant to include additional elements/components, etc., in addition to the listed elements/components/etc.

While the acceleration measuring device and the acceleration measuring method thereof in the present disclosure have been described in terms of various specific embodiments, those skilled in the art will recognize that the implementation of the present disclosure can be modified within the spirit and scope of the claims.

What is claimed is:

1. An acceleration measuring device, comprising:
   a housing having an inner cavity with a cavity wall, a bottom portion at a bottom end of the cavity wall, and a top portion opposite to the bottom portion;
   a reference substance in the inner cavity through an elastic supporting member, the elastic supporting member being connected between the bottom portion of the inner cavity and the reference substance;
   an elastic guide between the cavity wall of the inner cavity and the reference substance that limits the reference substance in a horizontal direction and allows the reference substance to move only in a vertical direction;
   a light source at a side of the reference substance away from the bottom portion of the inner cavity;
   a lens at a side, away from the reference substance, of the light source, a distance between the light source and the reference substance being less than a distance between the lens and the reference substance;
   an image sensor, at the top portion of the inner cavity, and at a side, away from the reference substance, of the lens for receiving a light emitted by the light source and scattered by the lens, the distance between the lens and the reference substance being less than a distance between the image sensor and the reference substance, and an orthographic projection of the image sensor on the reference substance overlaps with an orthographic projection of the lens on the reference substance; and
   a processor for calculating a displacement information of the reference substance in a vertical direction according to a light received by the image sensor, and calculating an acceleration of the reference substance according to the displacement information.

2. The acceleration measuring device according to claim 1, wherein the reference substance is secured in a bracket, and the elastic supporting member is vertically connected between the bottom portion of the inner cavity and the bracket.

3. The acceleration measuring device according to claim 1, wherein the elastic supporting member is vertically connected between the bottom portion of the inner cavity and the reference substance.

4. The acceleration measuring device according to claim 1, wherein the elastic guide is a beryllium bronze spring.

5. The acceleration measuring device according to claim 1, wherein the elastic guide is horizontally connected between a periphery of the reference substance and the cavity wall of the inner cavity.

6. The acceleration measuring device according to claim 1, wherein the reference substance is secured in a bracket, the elastic supporting member is vertically connected between the bottom portion of the inner cavity and the bracket, and the elastic guide is connected between the cavity wall of the inner cavity and the bracket.

7. The acceleration measuring device according to claim 1, further comprising an electromagnetic stabilizing mechanism comprising:
an electromagnet at a periphery of the reference substance; and
an electromagnetic coil on an inner wall of the inner cavity and corresponding to the electromagnet;
wherein when the image sensor is configured to detect a displacement information of the reference substance, the electromagnetic coil is energized to generate a magnetic field, and the electromagnet drives the reference substance to be stable under the action of the magnetic field.

8. The acceleration measuring device according to claim 1, wherein the light source is a parallel light source.

9. The acceleration measuring device according to claim 1, wherein the lens is a conical lens.

10. An acceleration measuring method for measuring acceleration of an object, comprising:
providing an acceleration measuring device comprising:
a housing having an inner cavity with a cavity wall, a bottom portion at a bottom end of the cavity wall, and a top portion opposite to the bottom portion;
a reference substance in the inner cavity through an elastic supporting member, the elastic supporting member being connected between the bottom portion of the inner cavity and the reference substance;
an elastic guide between the cavity wall of the inner cavity and the reference substance that limits the reference substance in a horizontal direction and allows the reference substance to move only in a vertical direction;
a light source at a side of the reference substance away from the bottom portion of the inner cavity;
a lens at a side, away from the reference substance, of the light source, a distance between the light source and the reference substance being less than a distance between the lens and the reference substance;
an image sensor, at the top portion of the inner cavity, and at a side, away from the reference substance, of the lens for receiving a light emitted by the light source and scattered by the lens, the distance between the lens and the reference substance being less than a distance between the image sensor and the reference substance, and an orthographic projection of the image sensor on the reference substance overlaps with an orthographic projection of the lens on the reference substance; and
a processor for calculating a displacement information of the reference substance in a vertical direction according to a light received by the image sensor, and calculating an acceleration of the reference substance according to the displacement information;
securing the housing of the acceleration measuring device on the object to be measured;
when the object to be measured outputs an acceleration, the image sensor receives a light emitted by the light source and scattered by the lens and measures a displacement signal of the reference substance according to the light and the processor calculates an acceleration according to the displacement signal and the following formula:
$a = K \cdot S / M$, where a is the acceleration, K is a stiffness coefficient of the elastic supporting member, S is the displacement of the reference substance in a vertical direction, and M is a mass of the reference substance.

* * * * *